United States Patent [19]
Takada et al.

[11] Patent Number: 5,275,088
[45] Date of Patent: Jan. 4, 1994

[54] RODLESS CYLINDER

[75] Inventors: Yoshiyuki Takada, Tokyo; Michikazu Miyamoto, Ibaraki, both of Japan

[73] Assignee: SMC Kabushiki Kaisha, Tokyo, Japan

[21] Appl. No.: 958,787

[22] Filed: Oct. 9, 1992

[30] Foreign Application Priority Data

| Oct. 11, 1991 | [JP] | Japan | 3-264166 |
| Oct. 14, 1991 | [JP] | Japan | 3-265091 |
| Nov. 1, 1991 | [JP] | Japan | 3-288120 |
| Jul. 29, 1992 | [JP] | Japan | 4-202765 |

[51] Int. Cl.$^5$ .................................... F01B 29/00
[52] U.S. Cl. .................................... 92/88; 92/165 R; 277/DIG. 7
[58] Field of Search ........................ 92/88, 165

[56] References Cited

U.S. PATENT DOCUMENTS

| 3,019,813 | 2/1962 | Dommann | 92/88 |
| 3,454,242 | 7/1967 | Feder et al. | 92/88 |
| 3,820,446 | 6/1974 | Granbom et al. | |
| 4,373,427 | 2/1983 | Garlapaty et al. | |
| 4,555,980 | 12/1985 | Hoglund | |
| 4,664,020 | 5/1987 | Kaiser | |
| 4,685,383 | 8/1987 | Ruschser | 92/88 |
| 4,838,147 | 6/1989 | Grishchenko | 92/88 |
| 5,097,716 | 3/1992 | Barbat et al. | 92/88 |

FOREIGN PATENT DOCUMENTS

| 0104364 | 4/1984 | European Pat. Off. |
| 0135041 | 3/1985 | European Pat. Off. |
| 0177850 | 4/1986 | European Pat. Off. |
| 0177880 | 4/1986 | European Pat. Off. |
| 0234033 | 9/1987 | European Pat. Off. |
| 0476265 | 3/1992 | European Pat. Off. |
| 3124915 | 1/1983 | Fed. Rep. of Germany |
| 3802703 | 8/1988 | Fed. Rep. of Germany |

*Primary Examiner*—Thomas E. Denion
*Attorney, Agent, or Firm*—Oblon, Spivak, McClelland, Maier & Neustadt

[57] ABSTRACT

The rodless cylinder includes a cylinder body, a piston, and a slide table connected to the piston. The slide table and the piston are united with each other due to a coupling part which projects through a slit formed in a longitudinal direction of the cylinder body. The slide table includes first and second load transmitters, whereas the cylinder body includes first and second load receivers corresponding to the first and second load transmitters. When a lateral load is applied to the slide table, the load is transmitted via one of the first and second load transmitters to a corresponding one of the first and second load receivers so as to transmit the force in a direction in which the slit of the cylinder body can be widened.

18 Claims, 11 Drawing Sheets

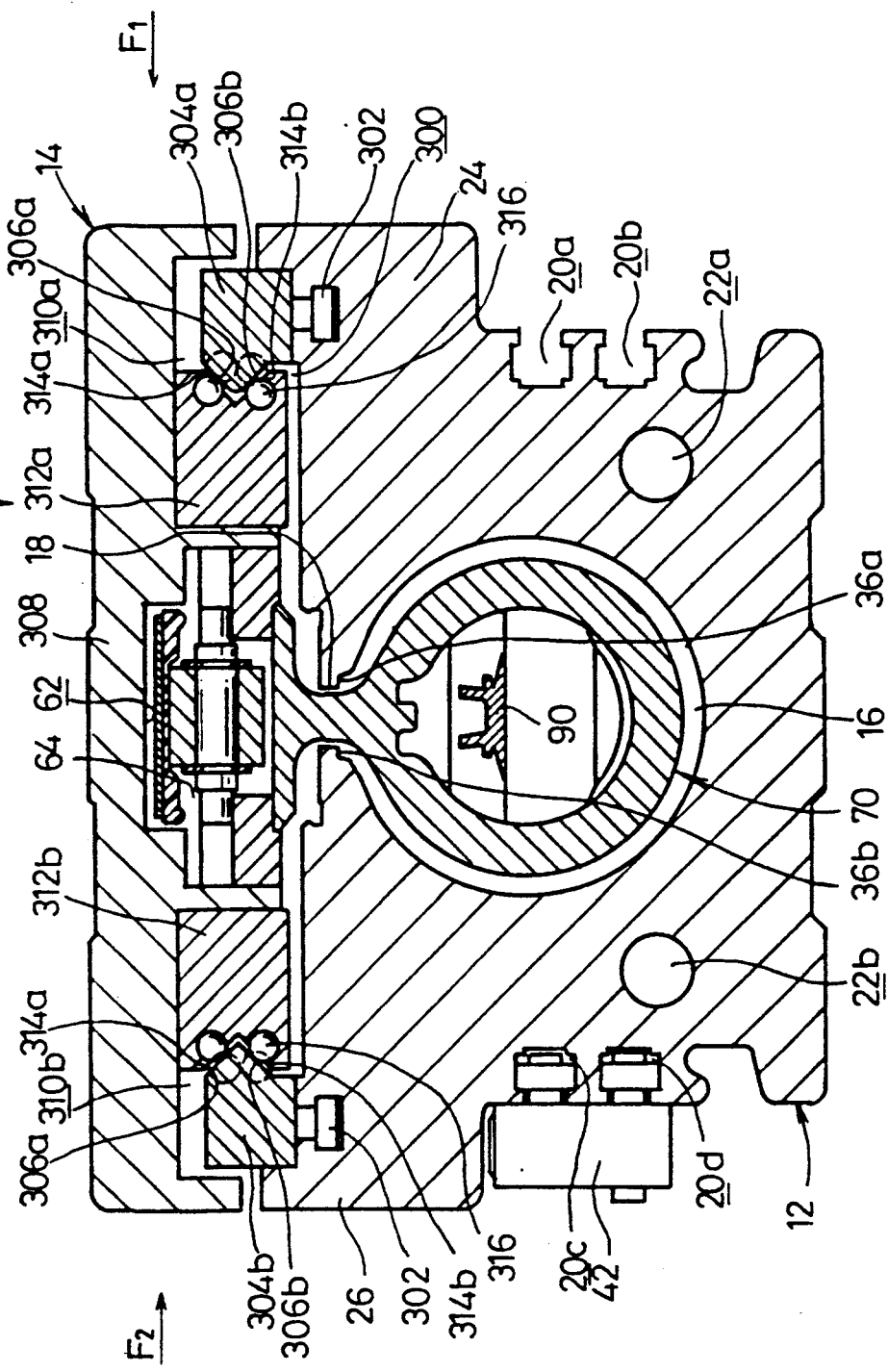

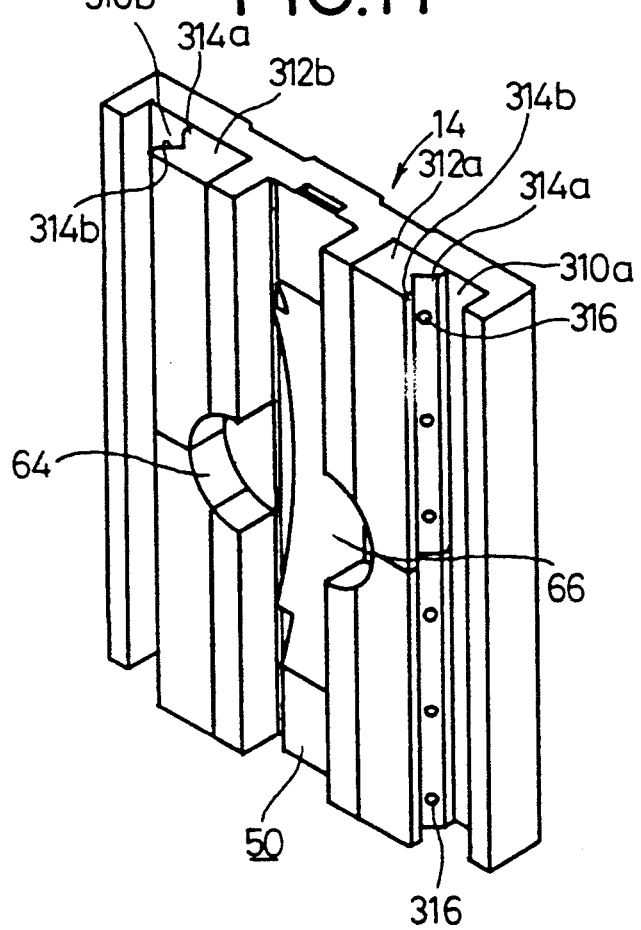

RODLESS CYLINDER

BACKGROUND OF THE INVENTION

1. Field of the Invention

The present invention relates generally to rodless cylinders, and more particularly to a rodless cylinder in which a slider table and a cylinder body are made as small possible to minimize their occupied space, the cylinder body sufficiently supporting any load applied to the slide table and smoothly displacing the slide table in accordance with piston's reciprocating motion.

2. Prior Art

Many factories have recently used rodless cylinders for various workpiece transfer devices.

The rodless cylinder has an advantage over a roded cylinder in a short stroke length, thus, in a sufficiently small occupied area for a convenient fabrication. In addition, the rodless cylinder has an advantage over the roded cylinder in preventing dust from entering the cylinder, and consequently in positioning an object with high-precision.

Such rodless cylinders can be seen in U.S. Pat. Nos. 4,373,427 and German Patent No. 3,124,915. In particular, the rodless cylinder disclosed in the German Patent No. 3,124,915 includes a guide groove, provided between an outer circumferential surface of a cylinder tube and a top surface with a slit of the cylinder, and distinct guide means, provided at a leg member extending from both sides of the slide table to the cylinder tube, which are engaged with the guide groove. According to the German Patent No. 3,124,915, the guide means are engaged with each other so as to prevent the width of the slit from widening when the lateral force is applied.

However, according to the German Patent No. 3,124,915, it is necessary to extend the leg member from the slide table to a part more external than an outer slide surface of the cylinder tube, so as to hold the guide means. Therefore, when the lateral force is applied to the slide table and the guide means are engaged with each other, one end surface of the cylinder tube which defines the slit is compulsively approaches the other end surface of the cylinder tube which defines he other side slit; consequently the bore is wholly reduced so as to compulsively stop the piston. That is, the piston comes to stop in response to the lateral force, and thus the workpiece transfer operation unexpectedly stops, and the device is forced to be reluctantly made large due to the leg member.

SUMMARY OF THE INVENTION

It is an object of the present invention to provide a rodless cylinder in which a piston never stops even when the lateral force is applied to a slide table, the slide table itself can smoothly reciprocate, and a device can be made compact as a whole.

Another object of the present invention is to provide a rodless cylinder which comprises:

a cylinder body, extending in a longitudinal direction of a cylinder tube with both ends occluded, which defines a slit communicating a bore to the exterior;

a piston which reciprocates inside the bore of the cylinder body;

a slide table, connected to the piston via a coupling member extending through the slit, which moves in accordance with the piston's reciprocating motion;

a sealing member engaged with the piston and/or the slide table so as to occlude the slit;

first and second load transmitting means for extending from the slide table to the cylinder body and for holding the coupling member; and first and second load receiving means provided on the cylinder body so as to correspond to the first and second load transmitting means, the first load transmitting means transmitting, when a first lateral load is applied to the slide table, the first lateral load to the first load receiving means so as to widen the slit, the second load transmits means transmitting, when a second lateral load directing opposite to the first lateral load is applied to the slide table, the second lateral load to the second load receiving means so as to widen the slit.

A further object of the present invention is to provide a rodless cylinder wherein the first and second load transmitting means each comprise bearings, and the first and second load receiving means each comprise bearing rolling surfaces mounted on the cylinder body.

A still further object of the present invention is to provide a rodless cylinder wherein the bearing rolling surfaces functioning as the first and second load receiving means each comprise rail members mounted on the cylinder body.

A yet further object of the present invention is to provide a rodless cylinder wherein the first and second load receiving means each comprise side surfaces each of which receives, when a load is applied to a top surface of the slide table, a force spreading toward the exterior via the first and second load transmitting means fixed on the slide table.

Another object of the present invention is to provide a rodless cylinder wherein the first and second load receiving means each comprise side surfaces each displaced by a predetermined angle against a surface which includes an axis line along which the piston reciprocates.

A further object of the present invention is to provide a rodless cylinder wherein the side surfaces of the first and second load receiving means are each displaced by 45° against the surface which includes the axis line along which the piston reciprocates.

A still further object of the present invention is to provide a rodless cylinder wherein a side surface of the first and second load receiving means is displaced by 90° against the side surfaces displaced by 45°.

Yet a further object of the present invention is to provide a rodless cylinder wherein the bearings each have substantially hexagonal sections.

Another object of the present invention is to provide a rodless cylinder wherein the first and second load receiving means are each provided on one surface of the cylinder body at a side of the slide table, and each comprise guide grooves having a pair of first oblique surfaces each directing a vertical surface which includes the axis line of the cylinder body, whereas the first and second load transmitting means are engaged with the guide grooves on a surface of the slide table at a side of cylinder body, and each comprises guide means having second oblique surfaces engaged with the first oblique surfaces and directing the exterior of the cylinder body so as to displace the slide table in response to the piston's reciprocating motion.

A further object of the present invention is to provide a rodless cylinder wherein the guide grooves comprise a pair of projecting parts each having oblique surfaces directing a direction along which the guide grooves open each other.

A still further object of the present invention is to provide a rodless cylinder wherein at least one of a pair of projecting parts is displaceable against the other projecting part.

Yet a further object of the present invention is to provide a rodless cylinder wherein the projecting parts each have synthetic resin films on a surface which is slidably in contact with the guide grooves.

Another object of the present invention is to provide a rodless cylinder wherein the first and second load receiving means comprise a pair of rail members each having guide surfaces each opposite to a surface of the cylinder body at a side of the slide table, whereas the first and second load transmitting means are each engaged with the guide surfaces of the respective rail members on a surface of the slide table at a side of the cylinder table and each comprise a pair of guide members having guide surfaces so as to displace the slide table in response to the piston's reciprocating motion.

A further object of the present invention is to provide a rodless cylinder wherein the guide surfaces of the guide members each comprise ball bearings to be engaged with the guide surfaces of the rail member.

Still a further object of the present invention is to provide a rodless cylinder wherein the guide surfaces of the rail members each comprises ball bearings to be engaged with the guide surfaces of the guide members.

Other objects and further features of the present invention will be fully understood from the detailed description of the preferred embodiments of the present invention with reference to the accompanying drawings.

BRIEF DESCRIPTION OF THE DRAWINGS

FIG. 10 shows a longitudinal sectional view of the slide table and the cylinder body of the rodless cylinder of still another embodiment according to the present invention; and FIG. 11 shows a perspective view depicting the slide table shown in FIG. 10.

DESCRIPTION OF THE PREFERRED EMBODIMENTS

Figure 1:
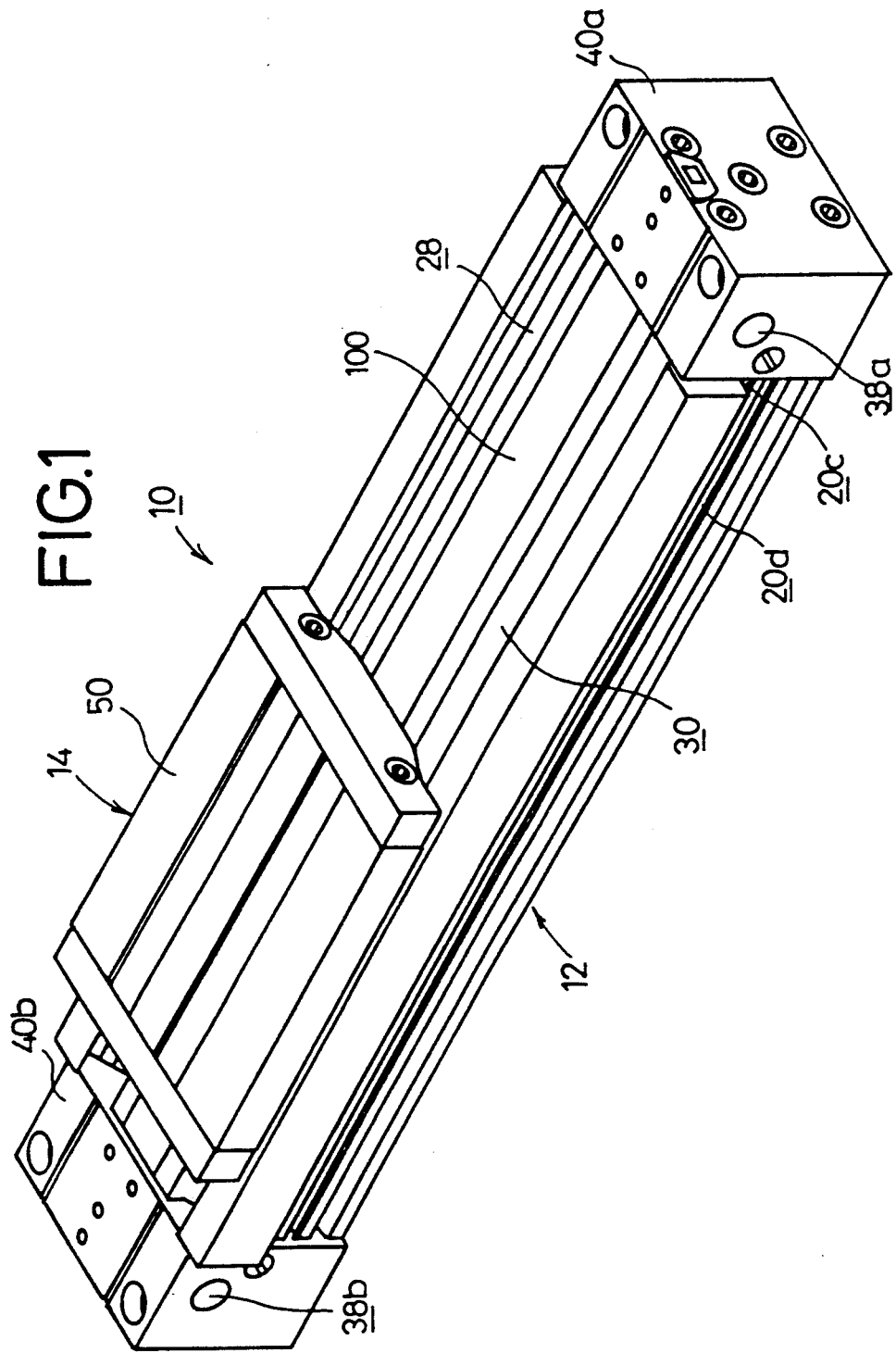
FIG. 1 shows a perspective view depicting a rodless cylinder according to the present invention.
Figure 2:
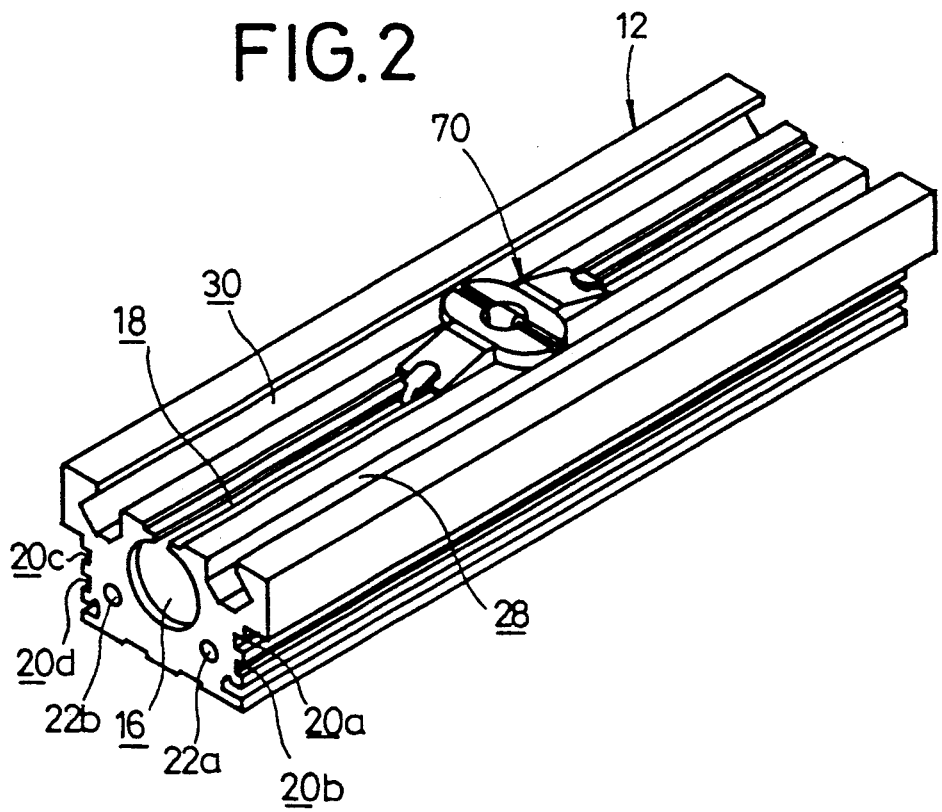
FIG. 2 shows a perspective view depicting a cylinder tube of the rodless cylinder according to the present invention.

In FIG. 1, numeral 10 denotes a rodless cylinder according to the present invention. The rodless cylinder 10 includes a tube body 12 and a slide table 14. The tube body 12 includes a bore 16 which extends, inside the tube body 12, in a longitudinal direction thereof (see FIG. 2); the bore 16 communicates to the exterior via a slit 18 formed on a top surface part shown in FIG. 2. On side surface parts of the tube body 12, as shown in FIGS. 2 and 3, long grooves 20a to 20d are formed to install sensors thereto, while extending in its longitudinal direction; in addition, fluid bypass passages 22a and 22b are formed for concentrated piping while extending in its longitudinal direction.

Above the long grooves 20a and 20c, projecting parts 24 and 26 are formed by expanding corner parts of the cylinder tube; a first guide groove 28 is formed between the projecting part 24 and the slit 18, whereas a second guide groove 30 is formed between the projecting part 26 and the slit 18.

Figure 3:
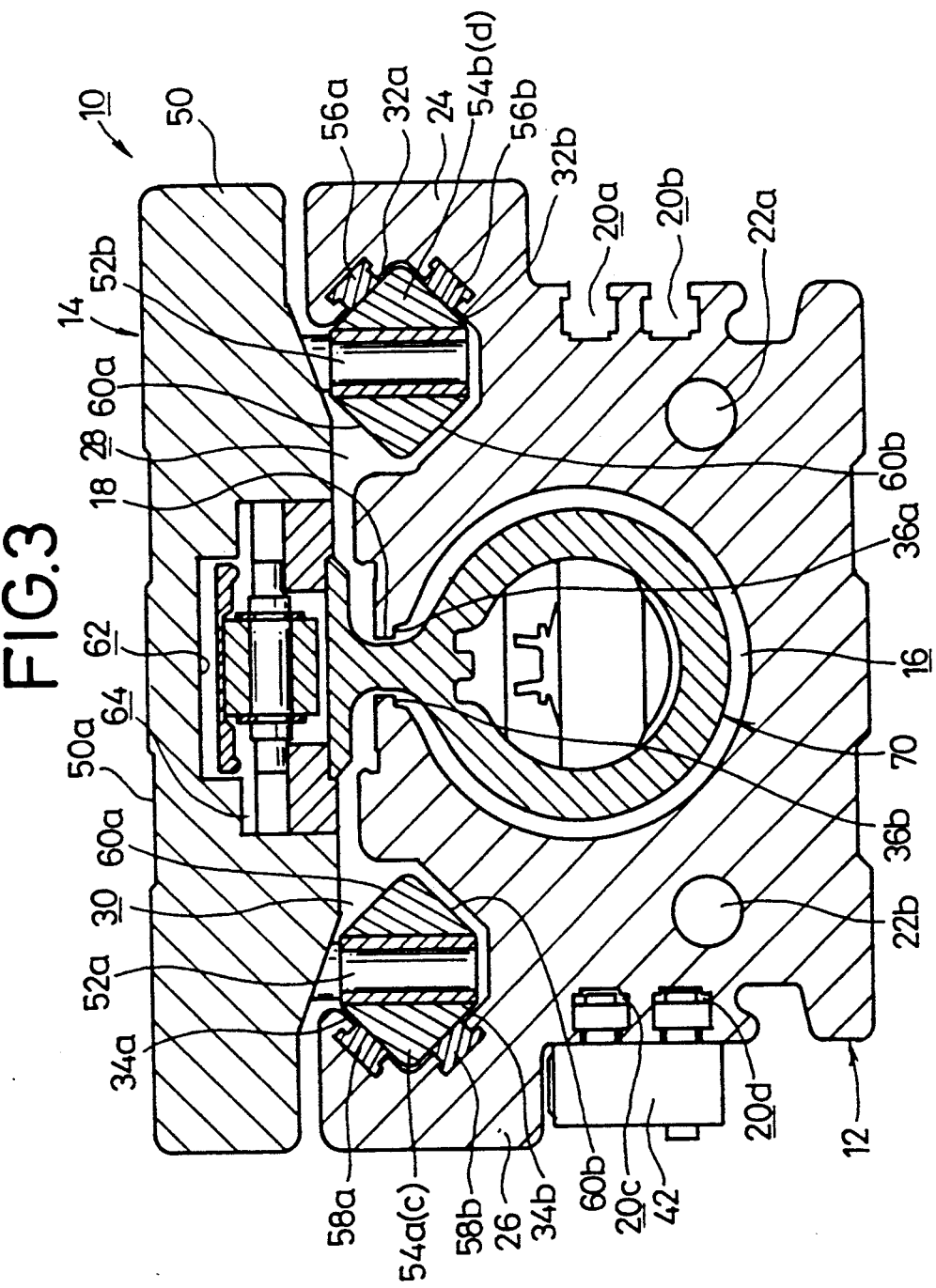
FIG. 3 shows a longitudinal sectional view of a slide table and a cylinder body of the rodless cylinder according to the present invention.

As is easily understood from FIG. 3, a side wall part of the rodless cylinder 10 which forms the first guide groove 28 has a first side surface 32a and a second side surface 32b which are displaced by 45° against a vertical surface including an axis line along which the undermentioned piston reciprocates, the first side surface 32a being displaced by 90° against the second side surface 32b.

On the other hand, as is applied to the second guide groove 30, a third side surface 34a and a fourth side surface 34b are displaced by 45° against the vertical surface including the axis line along which the piston reciprocates, the third side surface 34a being displaced by 90° against the fourth side surface 34b.

The bore 16 communicates with the exterior through the slit 18, as mentioned above; side walls which define the slit 18 each include step part 36a and 36b which spread toward the bore 16. Surfaces which extend from an internal surface of the slit 18 to the above are formed as horizontal surfaces, then once elected, and connected to the first guide groove 28 and the second guide groove 30.

Both ends of the tube body 12 which is constructed as mentioned above, are airtightly occluded by the end caps 40a and 40b having ports 38a and 38b (see FIG. 1). Incidentally, in FIG. 3, numeral 42 denotes a sensor which detects a position of the piston or the slide table 14.

Figure 4:
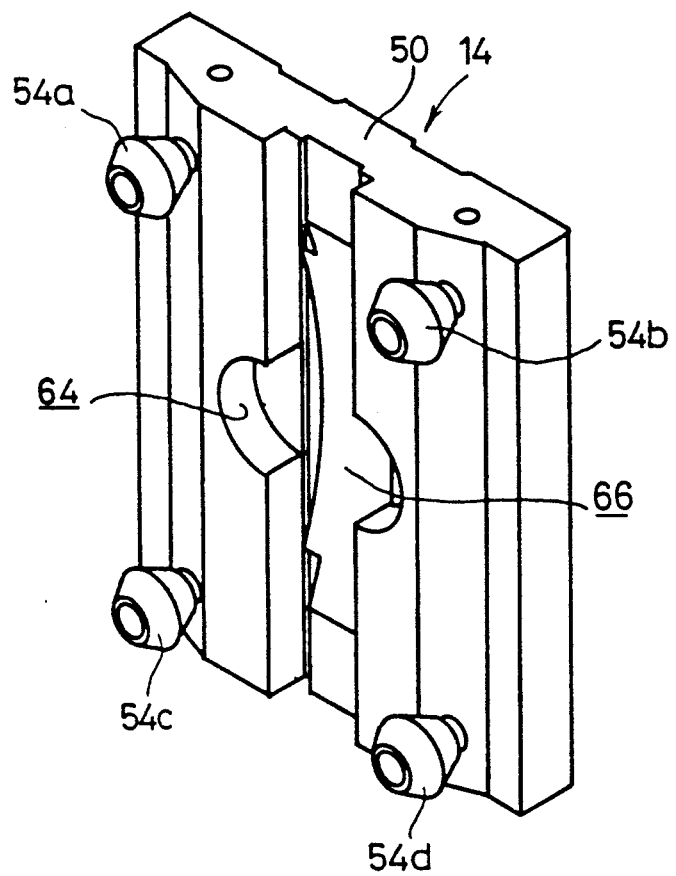
FIG. 4 shows a perspective view depicting the slide table of the rodless cylinder according to the present invention.

Next follows a description of the slide table 14. The side table 14 includes a relatively thick plate 50, as shown in FIGS. 3 and 4; the plate 50 includes four rods 52a to 52d downwardly extending from its corner parts, and abacus-ball-shaped guide rollers 54a to 54d rotatably fixed on the corresponding rods at their top parts. The guide rollers 54a to 54d each include rolling surfaces 60a and 60b which are in contact with rail members 56a, 56b, 58a and 58b, the rail members 56a, 56b, 58a, and 58b being inserted into grooves formed on the first to fourth side surfaces 32a, 32b, 34a, and 34b of the tube body 12. The rolling surfaces 60a and 60b are in contact, by predetermined pressure, with the rail members 56a, 56b, 58a, and 58b which have the same oblique angles with the first side surface 32a, and second side surface 32b, the third side surface 34a, and the fourth side surface 34b.

A groove 62 is defined to extend in the center part of and in the longitudinal direction of the slide table 14; elliptical space 64 opens at, the center part of the groove 62. Incidentally, the groove 62 has, as easily understood from FIG. 4, a curved concave part 66 directing a surface 50a of the plate 50 at the opposite side of the tube body 12.

Figure 5:
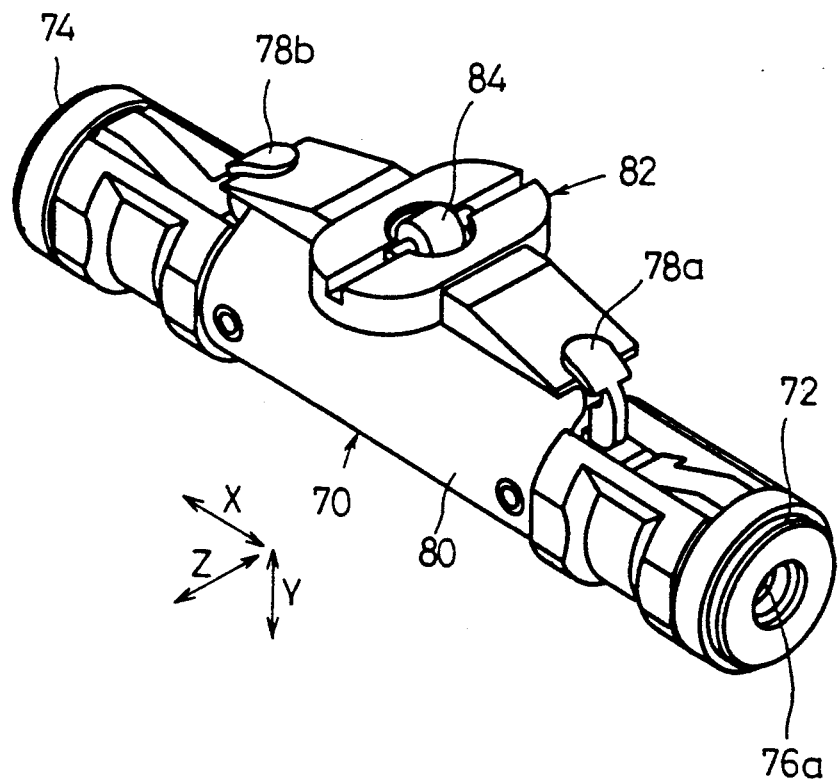
FIG. 5 shows a perspective view depicting a piston of the rodless cylinder according to the present invention.
Figure 6:
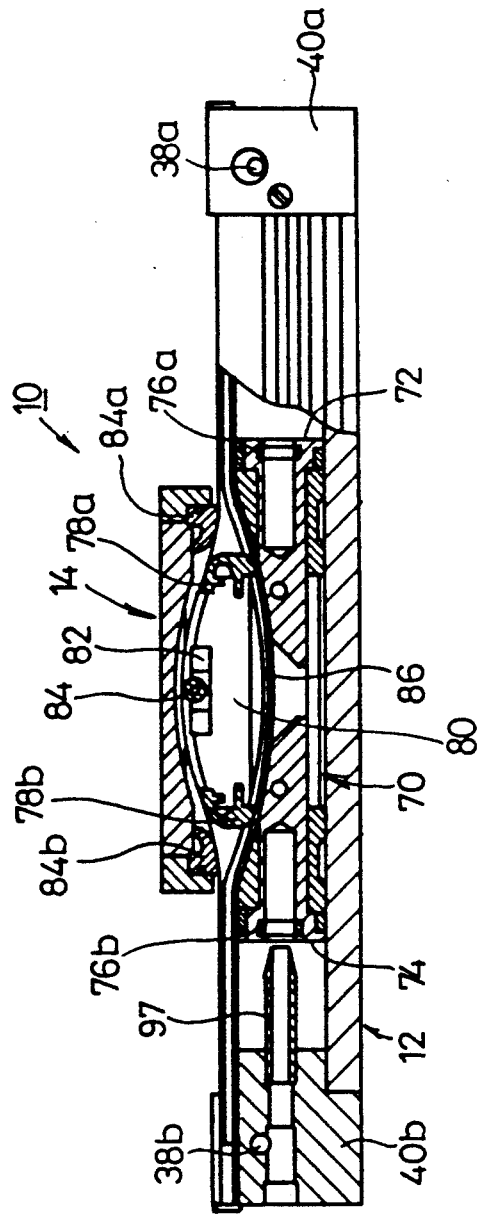
FIG. 6 shows a longitudinal sectional view depicting a side of the rodless cylinder.

FIG. 5 shows a piston 70. The piston 70 has a first pressure-receiving surface 72 and a second pressure-receiving surface 74 opposite thereto, which include therein cushion seals 76a and 76b (see FIG. 6). Belt separators 78a and 78b are fixed on a piston yoke 80 on the cylindrical piston; a roller 84 is fixed via a coupler 82 on the piston yoke 80. The coupler 82 has an elliptical shape so as to be inserted into the space 64 formed at the center part of the slide table 14. Therefore, as shown in FIG. 5, when the slide table 14 couples to the piston 70 via the coupler 82, firmly in the direction X, however, individually movably against the piston 70 in the directions Y and Z. As is easily understood by FIG. 6, the slide table 14 includes therein scrapers 84a and 84b. As is easily understood by FIG. 6, the coupler 82 has a plane circle shape, and is inserted into the elliptical space 64. Incidentally, in FIG. 6, reference numeral 86 denotes a passage through which the undermentioned first sealing member engages with the piston; numeral 97 denotes a cushion ring.

Figure 7:
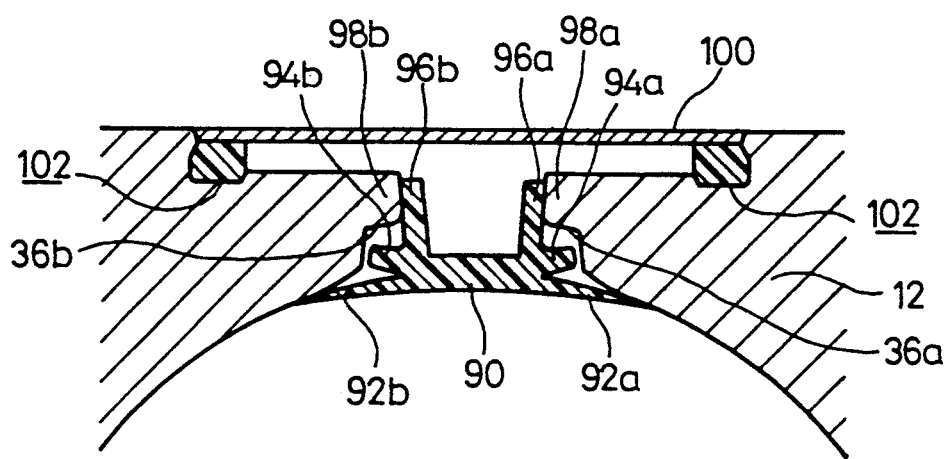
FIG. 7 shows a longitudinal sectional view of a part of an engagement state between a first sealing member and a slit of the rodless cylinder according to the present invention.

FIG. 7 shows sealing members to be inserted into the step parts 36a and 36b. A first sealing member 90 has above the tongue parts 92a and 92b. Engaging parts 96a and 96b extend from the extending parts 94a and 94b towards the above while somewhat opening. The extending parts 94a and 94b are engaged with each other when internal pressure is applied to the step parts 36a and 36b in the piston; the engaging parts 96a and 96b are engaged with internal surfaces 98a and 98b so as to define the slit 18. The first sealing member 90 is made, as one member, of flexible synthetic resin material. On the other hand, a second sealing member 100 occludes the slit 18, and is inserted into a groove 102 which extends above and in the longitudinal direction of the slit formed on the top end surface of the tube body 12. The first sealing member 90 enters the passage 86 of the piston 70; its both end parts are fixed by the second sealing member 100 and the end caps 40a and 40b.

The rodless cylinder according to the present invention is thus constructed as mentioned above; next follows a description of its operation.

When compressed air is applied from the port 38a, and compressed air pushes the first pressure-receiving surface 72 via the passage formed inside the cushion ring. Thereby, the piston is displaced to the left side in FIG. 6. Then, since the coupler 82 is inserted into the space 64 of the slide table 14, the piston 70 displaces the slide table 14 as a whole, and likewise transfers the same to the left side. Simultaneously, the belt separators 78a and 78b separate the first sealing member 90 from the second sealing member 100 between the slide table 14 and the piston 70. Therefore, only if a workpiece is placed on the slide table 14, the workpiece can be transferred to the left side in FIG. 6. Needless to say, when compressed air is applied to the port 38b, an operation reverse to the above description is performed.

Incidentally, the roller 84 is slidably in contact with the second sealing member 100 during it transferring, and facilitates to transfer the slide table 14.

By the way, suppose, in the above reciprocating activity, that an unexpected load is applied to the slide table 14 while a workpiece is being transferred. In this case, the load is transmitted to the guide rollers 54a and 54d via the rollers 52a to 52d. Since the guide rods 54a to 54d include the first side surface 32a, the second side surface 32b, the third side surface 34a, and the fourth side surface 34b, they can transmit, via the oblique angle thereof, the force to the rail members 56a, 56b, 58a, and 58b. The rail members 56a, 56b, 58a, and 58b assist the guide rollers 54a to 54d to rotate during the workpiece transferring, and sufficiently receive such an overweight load. Therefore, since the sufficient transfer operation can be retained even when an unexpected load is applied to the slide table 14, the undesirable case disclosed in the prior art in which the diameter of bore is reduced and the piston is stopped never happens. The sensor 42 detects the respective positions of the piston 70 and the slide table 14.

Figure 8:
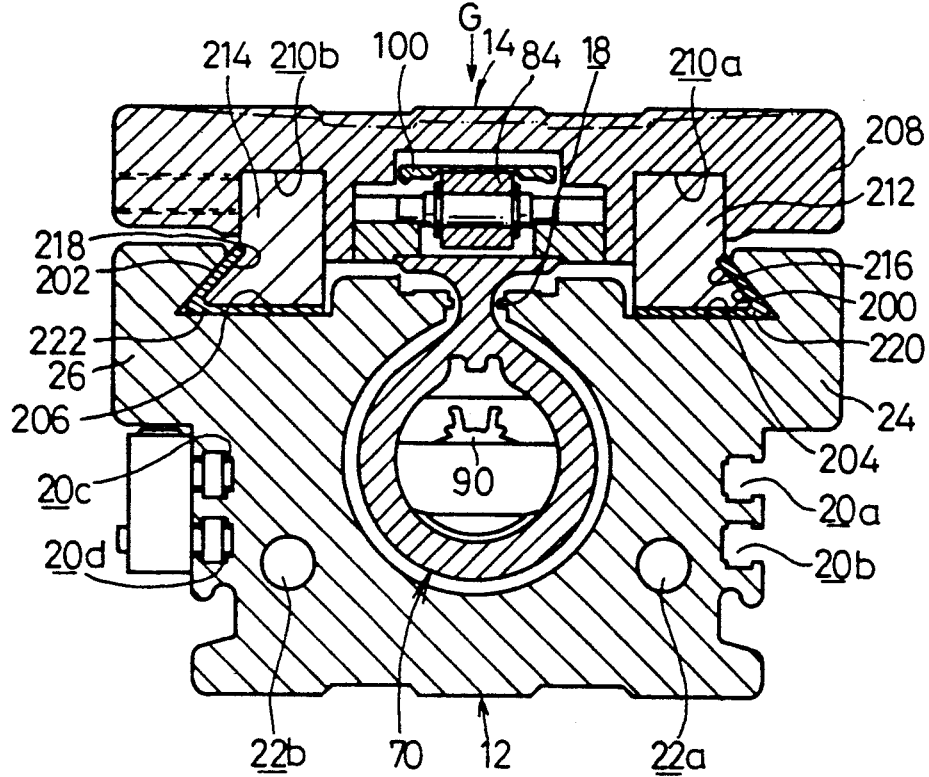
FIG. 8 shows a longitudinal sectional view of the slide table and the cylinder body of the rodless cylinder of another embodiment according to the present invention.
Figure 9:
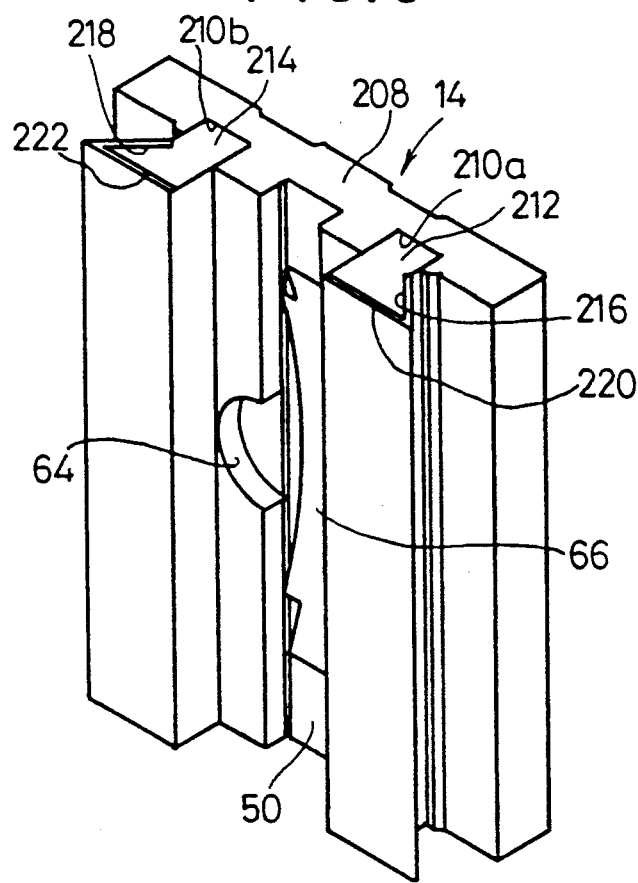
FIG. 9 shows a perspective view depicting the slide table shown in FIG. 8.

FIGS. 8 and 9 show another embodiment according to the present invention. Those elements which are the same as corresponding elements in the above embodiments are designated by the same reference numerals, and a detail description thereof will be omitted.

Above the long grooves 20a and 20b, the projecting parts 24 and 26 are formed by expanding the corner parts of the cylinder body 12; the first guide groove 28 is defined between the projecting part 24 and the slit 18; the second guide groove 30 is formed between the projecting part 26 and the slit 18. The first guide groove 28 includes an oblique surface 200 directing the vertical surface including the axis line of the cylinder body 12, whereas the second guide groove 30 likewise includes an oblique surface 202. Incidentally, the first guide groove 28 further includes a horizontal surface 204 connected to the oblique surface 200; the second guide groove 30 likewise includes a horizontal surface 206 connected to the oblique surface 202.

Next follows a description of the slide table 14 of this embodiment. As shown in FIGS. 8 and 9, the slide table 14 includes a relatively thick plate 208; long grooves 210a and 210b are provided along the longitudinal direction of the plate 208. The respective long groove 210a and 210b are engaged, as shown in FIG. 8, with the leg members 212 and 214; the leg members 212 and 214 respectively include an oblique surface 216 which is slidably in contact with an oblique surface 200, and an oblique surface 218 which is slidably in contact with an oblique surface 202. It is preferable to coat frictionproof and durable synthetic resin material 220 and 222 around the part of the leg members 212 and 214. As is easily understood from FIG. 8, the distance between the leg members 214 and 212 can be adjusted by inserting a bolt (not shown) into a hole part indicated by a broken line and tightening the bolt.

Thus, according to this embodiment with the above construction, suppose that an unexpected load is applied to the slide table 14 during the workpiece transferring. The unexpected load is indicated by numeral G in FIG. 8. At this time, the load G is transmitted via the leg member 212 and 214 so as to spread the oblique surfaces 200 and 202 of the cylinder body 12 (see broken line in FIG. 8). That is, the leg members 212 and 214 transmit the force via the synthetic resin material 220 and 222 while opening the expanding parts 24 and 26 via the oblique surfaces 200 and 202. These oblique surfaces 216, 218, 200 and 202 sufficiently receive such an overweight load. Therefore, even if the unexpected load G is applied to the slide table 14, the undesirable case disclosed in the prior art in which the diameter of the bore is reduced and the piston is stopped never happens. The sensor 42 detects the respective positions of the piston 70 and the slide table 14.

FIG. 10 and FIG. 11 show still another embodiment according to the present invention.

Above the long grooves 20a, 20b, 20c, and 20d, the projecting parts 24 and 26 are formed by expanding the corner parts of the cylinder body 12; a concave portion 300 is formed between the projecting part 24 and the slit 18. On both side parts of the concave part 300, a pair of rail members 304a and 304b are fixed while extending in its longitudinal direction by a bolt 302. The rail members 304a and 304b respectively include oblique surfaces 306a and 306b which are formed to be slanted by approximately 45°.

Next follows a description of the slide table 14. The slide table 14 includes a relatively thick plate 308, as shown in FIGS. 10 and 11; the plate 308 includes, at a side surface opposite to the cylinder body 12, long grooves 310a and 310b which extend in its longitudinal direction. The long grooves 310a and 310b include therein guide members 312a and 312b. As is easily understood by FIG. 10, the guide members 312a and 312b include oblique surfaces 314a and 314b which are concave parts corresponding to the oblique surfaces 306a and 306b; ball bearings 316 are provided in the longitudinal direction of the oblique surface 314a and 314b with a predetermined interval, and part of the spherical surface of the ball bearings 316 touches the oblique surfaces 306a and 306b.

According to this embodiment with the above construction, if an unexpected load, for example, a load from a direction F1 shown in FIG. 10, is applied during the workpiece transferring, the load is first transmitted via a plurality of ball bearings 316 to the rail member 304b, and then transmitted to the cylinder body 12. Consequently, since the load enforces to widen the slit 18, the undesirable case disclosed in the prior art in which the diameter of the bore 16 is reduced and the piston 70 is stopped never happens during the workpiece transferring. This is likewise applied to a load in a direction F2.

Incidentally, if a load in the direction G is applied to the slide table 14, it is transmitted by the right and left guide members 312a and 312b, via a plurality of ball bearings 316, to the right and left rail members 304a and 304b, and then transmitted to the cylinder body 12. Consequently, since the operating load is divided into such two directions as widen the slit 18, the undesirable case disclosed in the prior art in which the diameter of bore 16 is reduced and the piston 70 is stopped during the workpiece transferring never happens.

According to the present invention, even if an overweight load is applied to the slide table, the smooth operation can be retained without stopping the slide table and the piston. In addition, the leg member is not necessarily formed to be extended from the slide table to the cylinder tube body, a width of the slide table can be made equal to or smaller than that of the cylinder tube body. Therefore, the present invention has a remarkable advantage in that the device can be made small in size.

What is claimed is:

1. A rodless cylinder comprises:
   a cylinder body, extending in a longitudinal direction of a cylinder tube with both ends thereof closed, which defines a slit communicating a bore to the exterior of the cylinder body;
   a piston which reciprocates inside the bore of said cylinder body;
   a slide table, connected to said piston via a coupling member extending through said slit, which is spaced a predetermined distance from the top surface of said cylinder body and moves in accordance with reciprocating motion of said piston;
   a sealing member which engages one of said piston and said slide table so as to at least partially cover the slit;
   first and second load transmitters extending from said slide table to said cylinder body for holding a coupling member; and
   first and second load receivers provided on said cylinder body which include grooves defined by first and second surfaces connected to each other so as to correspond to said first and second loads transmitters, said first load transmitter transmitting, when a first lateral load is applied to said slide table, the first lateral load to said first load receiver so as to at least partially widen said slit, whereas said second load transmitter transmits, when a second lateral load directed opposite to the first lateral load is applied to said slide table, the second lateral load to the second load receiver so as to at least partially widen said slit wherein when a load is applied to a top surface of said slide table, a force is applied to said first and second load transmitters fixed on said slide table so as to spread said first and second load receivers outwardly toward the exterior of said cylinder body.

2. A rodless cylinder according to claim 1, wherein said sealing member is engaged with said piston so as to occlude the slit.

3. A rodless cylinder according to claim 1, wherein said sealing member is engaged with said slide table so as to occlude the slit.

4. A rodless cylinder according to claim 1, wherein said first and second load transmitters each comprise bearings, and said first and second load receivers each comprise bearing rolling surfaces mounted on said cylinder body.

5. A rodless cylinder according to claim 2, wherein said first and second load receivers each comprise side surfaces which each receive, when a load is applied to a top surface of said slide table, a force spreading toward the exterior via said first and second load transmitters fixed on said slide table.

6. A rodless cylinder according to claim 4, wherein said bearing rolling surfaces functioning as said first and second load receivers each comprise rail members mounted on said cylinder body.

7. A rodless cylinder according to claim 1, wherein said first and second load receivers each comprise side surfaces each of which receives, when said load is applied to a top surface of said slide table, a force spreading toward the exterior via said first and second load transmitters fixed on said slide table.

8. A rodless cylinder according to as in one of claims 1 to 4 and 16, wherein said first and second load receivers each comprise side surfaces each displaced by a predetermined angle against a surface including an axis line along which the piston reciprocates.

9. A rodless cylinder according to claim 8, wherein said side surfaces are each displaced by 45° against a surface including the axis line along which the piston reciprocates.

10. A rodless cylinder according to claim 9, wherein said side surfaces of said first and second load receivers are displaced by 90° against the side surfaces displaced by 45°.

11. A rodless cylinder according to claim 4, wherein said bearings each have substantially hexagonal sections.

12. A rodless cylinder according to claim 1, wherein said first and second load receivers are each provided on one surface of said cylinder body at a side of said slide table, and each comprise guide grooves having a pair of first oblique surfaces each directing a vertical surface which includes an axis line of said cylinder body, whereas said first and second load transmitters are engaged with the guide grooves on a surface of said slide table at a side of cylinder body, and each comprise guide means having second oblique surfaces engaged with said first oblique surfaces and directing the exterior of said cylinder body so as to displace said slide table in response to the piston's reciprocating motion.

13. A rodless cylinder according to claim 12, wherein said guide grooves comprise a pair of projecting parts each having oblique surfaces directing a direction along which the guide grooves open each other.

14. A rodless cylinder according to claim 13, wherein at least one of said pair of projecting parts is displaceable against the other projecting part.

15. A rodless cylinder according to as in one of claims 13 to 11, wherein said projecting parts each have synthetic resin films on a surface which is slidably in contact with said guide grooves.

16. A rodless cylinder according to claim 1, wherein said first and second load receivers means comprise a pair of rail members each having guide surfaces each opposite to a surface of said cylinder body at a side of said slide table, whereas said first and second load transmitters are each engaged with said guide surfaces of the respective rail members on a surface of said slide table at a side of said cylinder table and each comprise a pair of guide members having guide surfaces so as to displace said slide table in response to the piston's reciprocating motion.

17. A rodless cylinder according to claim 16, wherein said guide surfaces of the guide members each comprise ball bearings to be engaged with said guide surfaces of the rail member.

18. A rodless cylinder according to claim 16, wherein said guide surfaces of the rail members each comprise ball bearings for engaging said guide surfaces of the guide members.

* * * * *